P. G. CHALLISS.
DETACHABLE RIM FOR VEHICLE WHEELS.
APPLICATION FILED NOV. 23, 1907.
943,811.
Patented Dec. 21, 1909.
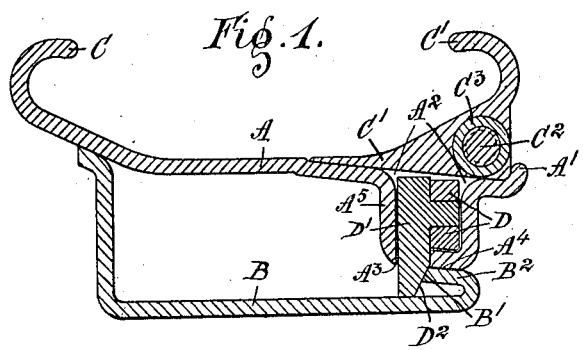
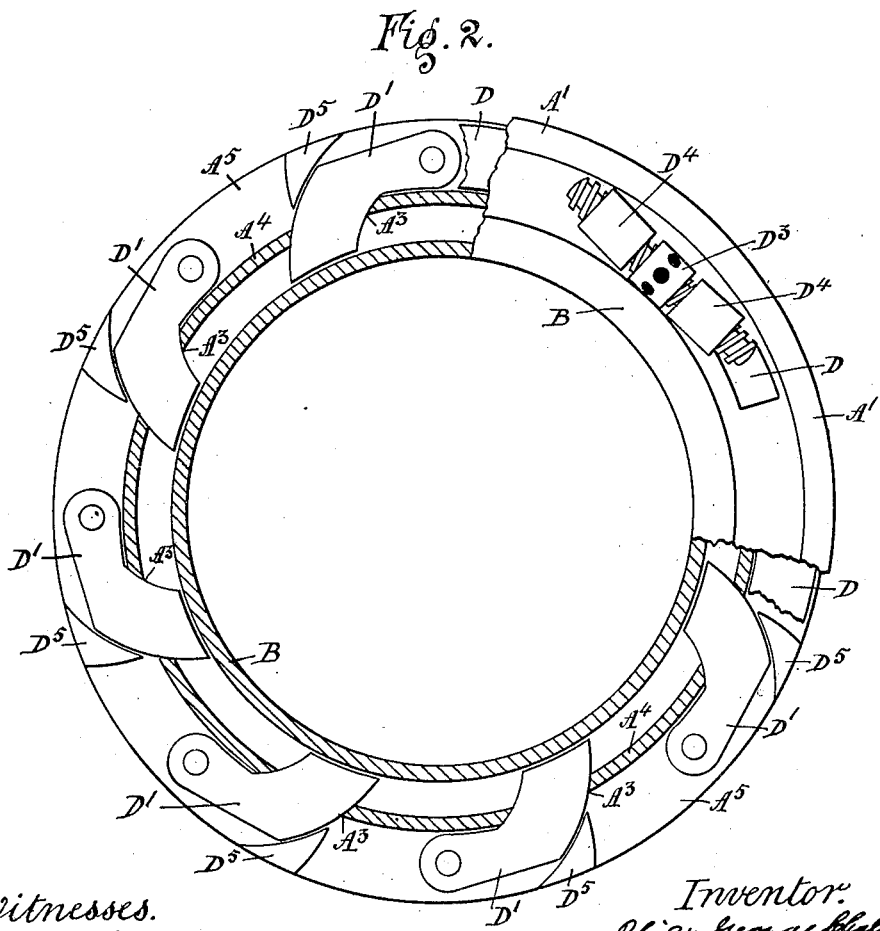
Witnesses.
E. W. Bayly,
J. A. P. Day
Inventor.
Philip George Challiss,
per John Pitt Bayly,
attorney.

UNITED STATES PATENT OFFICE.

PHILIP GEORGE CHALLISS, OF FOREST HILL, ENGLAND.

DETACHABLE RIM FOR VEHICLE-WHEELS.

943,811.

Specification of Letters Patent. Patented Dec. 21, 1909.

Application filed November 23, 1907. Serial No. 403,445.

*To all whom it may concern:*

Be it known that I, PHILIP GEORGE CHALLISS, gentleman, a subject of the King of Great Britain, residing at 12 The Park, Forest Hill, in the county of Surrey, in England, have invented new and useful Improvements in and Relating to Detachable Rims for Vehicle-Wheels, of which the following is a specification.

My said invention has reference to improvements in and relating to detachable rims of pneumatic-tired wheels for motor cars and other vehicles, and its objects are, firstly to enable a damaged tire with its rim to be quickly, and easily replaced, when on a journey by a spare tire carried, as is now usual, mounted on a rim, and inflated ready for use; the detachment and attachment being effected in each case by a single operation, which simultaneously unlocks or locks the rim to the felly, or bonding-band, at any desired number of places; and, secondly, to facilitate the removal of a damaged tire from its rim.

In carrying my invention into effect, I make the rim in two parts. The main part A is adapted to slide on to the wheel felly or bonding-band B from one side, and to be secured thereon by the means hereinafter indicated, and it has, formed on it, one of the usual annular tire-cover-retaining lips C. The other part of the rim consists essentially of the other annular tire-cover-retaining lip C', the said part C' is divided transversely, and fitted with means, such as a right and left handed screw C², working in suitable nuts secured in, or on, its two ends C³, for drawing the said two ends C³ together, or forcing them apart, thereby contracting or expanding the said part C'; the said part C' fits removably upon the said main part A, and is retained laterally thereon by a flange A' formed on the said main part A. For the purpose of securing the said rim upon the said felly or bonding-band B, I form the annular groove A², in the said main part A, preferably immediately under the said removable part C', in the said groove A², I place a revoluble ring D divided transversely in one place. On the said revoluble ring D, I pivotally mount, in the said groove A², a series of pawl-shaped latches or fingers D', the free ends or points of the said latches D' are beveled on one side, and are adapted to project through slots A³, cut in the said annular groove A², until they engage with a ridge B', beveled on the side meeting the said latches D', to a corresponding angle to the bevel on the said free ends of the said latches D', the said ridge B' is formed on the said bonding-band B by overturning or doubling back the edge B². The base or inner wall A⁴ of the said annular groove A², forms a female cone of a suitable angle, and the said overturned edge B² of the said bonding-band B, forms a male cone of the same angle, the arrangement being such, that as the beveled surfaces of the said latches D' are forced, by the rotation of the said revoluble ring D, across the corresponding beveled surface of the said ridge B', a cramping action is brought about, drawing the said female cone A⁴, over the said male cone B², thereby tightening the whole. The said revoluble ring D, is adapted to be rotated by a right and left handed screw D³, working in nuts D⁴, one of which is attached to the said ring D, and the other to the said main part A, and the said latches D', are forced inwardly into contact with the said bonding-band B, by the rotation of the said ring in one direction, driving them against cam or like surfaces D⁵, projecting from the wall A⁵ of the said annular groove A², and are drawn back out of contact with the said bonding-band B, by the rotation of the said revoluble ring D in the opposite direction.

In the accompanying drawings:—Figure 1, is a transverse section, showing the main part A, its lip C, the removable lip C', with its right and left handed screw C², and the flange A', which holds it laterally; the ring D, and pivotally mounted thereon, the latches D', projecting through the slots A³, their beveled points D², in contact with the beveled ridge B' of the bonding-band B, the edge B², of which is coned to the same angle as the base A⁴, of the annular groove A², from the wall A⁵, of which the cams D⁵ project. Fig. 2, is a longitudinal section part of which is reduced in diameter, showing the cams D⁵, the latches D', the slots A³ through which they project, the bonding-band B, the right and left handed screw D³, and its nuts D⁴.

What I do claim as my invention, and desire to secure by Letters Patent, is—

1. An attachment for vehicle wheels comprising an annular member adapted to be applied to a wheel-felly and having opposed tire-retaining flanges, said annular member also having a lateral annular groove, and a locking ring arranged in said annular groove and provided with latches adapted to have a locking action or engagement with said felly-member.

2. An attachment for vehicle wheels including an annular member having opposed tire retaining flanges, said annular member having a lateral annular groove, a felly-member having an inturned overlying portion upon which the bottom of said grooved portion of said annular member rests, and a locking ring arranged in said groove and provided with latches with their effective portions passing through apertures in the bottom of the groove and having beveled surfaces engaging the inner edge of said inturned portion of the felly-member.

3. An attachment for vehicle wheels comprising an annular member adapted to be applied to a wheel-felly and having opposed tire-retaining flanges and a lateral annular groove having one wall provided with cams, and a locking ring arranged in said groove and provided with pivoted latches engaging said cams and passing through the bottom of said groove and engaging said felly-member, and means for actuating said locking ring and accordingly effecting the synchronous locking action of its latches.

In witness whereof I have hereunto set my hand in presence of two witnesses.

PHILIP GEORGE CHALLISS.

Witnesses:
EDMUND S. G. GILBERT,
DAVID KIRBY.